March 26, 1957     G. R. CONRAD     2,786,541
VERTICAL ADJUSTING MECHANISM BETWEEN HOUSING AND
DRIVE WHEELS FOR SELF-PROPELLED LAWN MOWER
Filed April 18, 1955     2 Sheets-Sheet 1
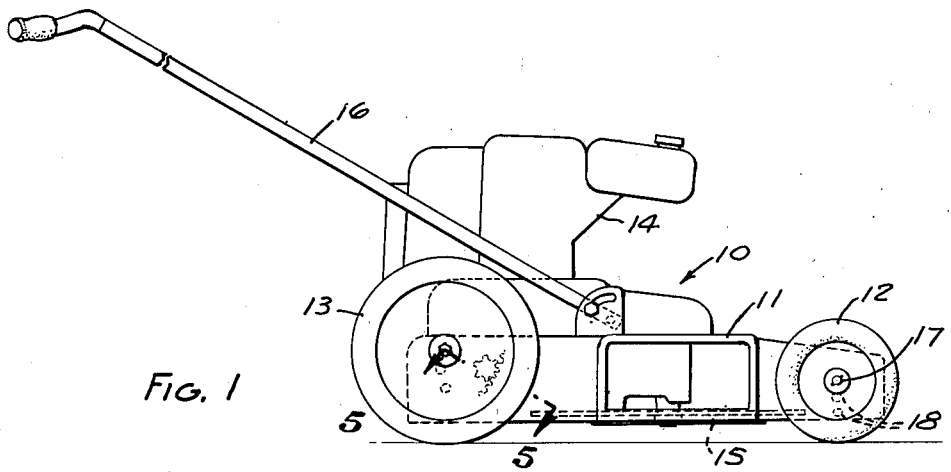
FIG. 1
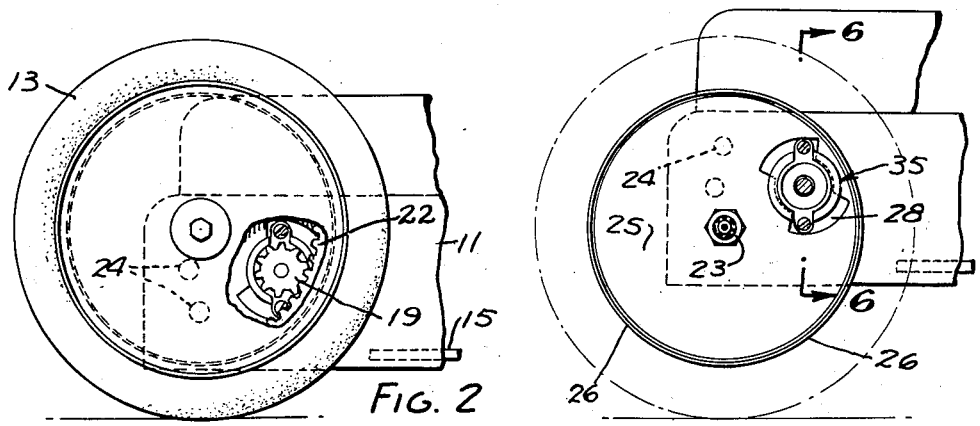
FIG. 2
FIG. 3
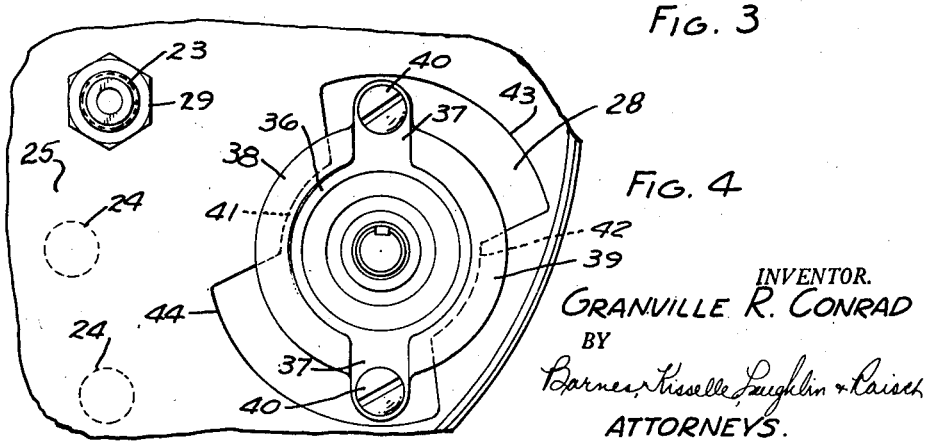
FIG. 4
INVENTOR.
GRANVILLE R. CONRAD
BY
Barnes, Kisselle, Laughlin & Raisch
ATTORNEYS.

March 26, 1957   G. R. CONRAD   2,786,541
VERTICAL ADJUSTING MECHANISM BETWEEN HOUSING AND
DRIVE WHEELS FOR SELF-PROPELLED LAWN MOWER
Filed April 18, 1955   2 Sheets-Sheet 2

INVENTOR.
GRANVILLE R. CONRAD
BY
Barnes, Kisselle, Laughlin & Raisch
ATTORNEYS.

2,786,541

VERTICAL ADJUSTING MECHANISM BETWEEN HOUSING AND DRIVE WHEELS FOR SELF-PROPELLED LAWN MOWER

Granville R. Conrad, Detroit, Mich., assignor to Motor Wheel Corporation, Lansing, Mich., a corporation of Michigan Application April 18, 1955, Serial No. 502,034

10 Claims. (Cl. 180—41)

This invention relates to power lawn mowers and particularly to self-propelled power lawn mowers.

In self-propelled power lawn mowers, the power unit, which may comprise an internal combustion engine or an electric motor, is used to rotate the cutting blades and, in addition, to rotate one or more traction wheels for propelling the lawn mower along the ground.

It is an object of this invention to provide a self-propelled power lawn mower wherein the position of the traction wheels may be quickly changed with a minimum of disassembly of the lawn mower, in order to adjust the height of grass cut.

In the drawings:

Fig. 1 is an elevational view of a self-propelled power lawn mower embodying the invention.

Fig. 2 is a fragmentary, part sectional, elevational view of a portion of said lawn mower.

Fig. 3 is a fragmentary view similar to Fig. 2 with the wheel and drive gear removed and showing the shaft on which the wheel is mounted in a different position.

Fig. 4 is a fragmentary view similar to Fig. 3, on an enlarged scale, with the shaft on which the wheel is mounted in the same position as in Fig. 2.

Figure 5:
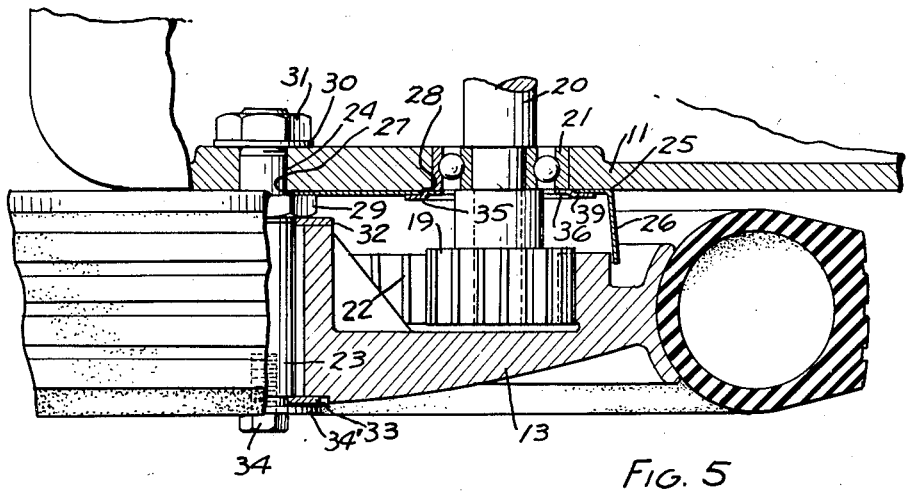
Fig. 5 is a fragmentary sectional view taken along the line 5—5 on Fig. 1, on an enlarged scale.

Referring to Fig. 1, a self-propelled power lawn mower 10 may comprise a housing 11 having a pair of front idler wheels 12 and a pair of rear traction wheels 13 mounted on the housing. Power unit 14 is mounted on the housing of the lawn mower and rotates both cutting blade 15, which is mounted about a substantially vertical axis, and traction wheels 13. A handle 16 is attached to the housing 11 for guiding the mower along the ground.

The front wheels 12 are rotatably mounted on short shafts 17 which are fastened in one of several vertically spaced holes 18 in the side of the housing 11. The position of each front wheel 12 may be adjusted by changing the opening 18 in which its respective shaft 17 is fastened.

As shown in Figs. 2 and 5, each of the traction wheels 13 is driven by a pinion gear 19 keyed to a shaft 20 which in turn is driven by the power unit 14 of the lawn mower as presently described. The drive shaft 20 projects through an opening in the side of the housing 11 in which is positioned a bearing 21. The pinion gear 19 meshes with a ring gear 22 which is formed integral with the traction wheel 13. Each of the traction wheels 13 is rotatably mounted on a stub shaft 23 which is mounted in one of several openings 24 in the side of the housing 11. The openings 24 in which the stub shaft 23 may be selectively mounted are vertically spaced and lie in an arc swung about the axis of drive shaft 20. In this manner, the proper engaging relationship between the drive gear 19 and the ring gear 22 is maintained in each position of the wheel.

A flat circular backing plate 25 is provided against the side of the housing and includes a circular peripheral skirt 26 which projects into close proximity with the outer edge of ring gear 22 to prevent dirt, grass and the like from entering the area surrounding the gears. As shown in Fig. 5, the backing plate 25 includes an opening 27 at its center through which stub shaft 23 projects and an opening 28 through which drive shaft 20 projects.

As further shown in Fig. 5, stub shaft 23 includes an integral nut portion 29 which contacts the backing plate 25 and in turn holds the plate 25 against the side of the housing. The stub shaft 23 includes a reduced portion which projects through the housing and is held in position by a washer 30 and bolt 31 threaded on the end of the short shaft. A washer 32 is provided between the integral nut portion 29 and the hub of the wheel 13, and a second washer 33 is provided on the other end of the stub shaft 23. Bolt 34 threads into the end of the stub shaft to rotatably mount the wheel on the stub shaft and a lock washer 34' is provided.

The bearing 21 is retained in position in the housing 11 by means of a retainer 35. As shown in Fig. 4, the retainer comprises a central annular dished or depressed portion 36, a pair of mounting tabs 37 and arcuate peripheral portions 38, 39 lying in a plane spaced slightly outwardly from the plane of depressed portion 36 and the tabs 37. The retainer is held in position by screws 40 passing through the tabs 37.

The opening 28 in the backing plate 25 is in the form of a winged hole the center of which is formed by two circular arc portions 41, 42 and the wings of which are formed by two segmental cut-out portions 43, 44. The backing plate 25 is held in position by the peripheral portion of the bearing retainer as shown in Fig. 5, with the arcuate edges 41, 42 bearing against the peripheral edge of depressed portion 36 of retainer 35.

As previously set forth, the openings 24 in which the stub shaft 23 may be selectively mounted are vertically spaced and lie in an arc swung about the center of drive shaft 20. In this manner, when the wheel and stub shaft 23 are removed, the backing plate 25 may be rotatably adjusted to a new position without removing it from the housing, merely by swinging the backing plate in an arc about the center of the drive shaft 20, and bringing opening 27 of the backing plate 25 into alignment with the desired opening 24 in the housing. The angular extent of the segmental cut-out portions 43, 44 is at least as great as the angular extent of the arc on which the openings 24 lie, in order that the tabs 37 of bearing retainer 35 will not interfere with the necessary movement of the backing plate 25.

Figure 6:
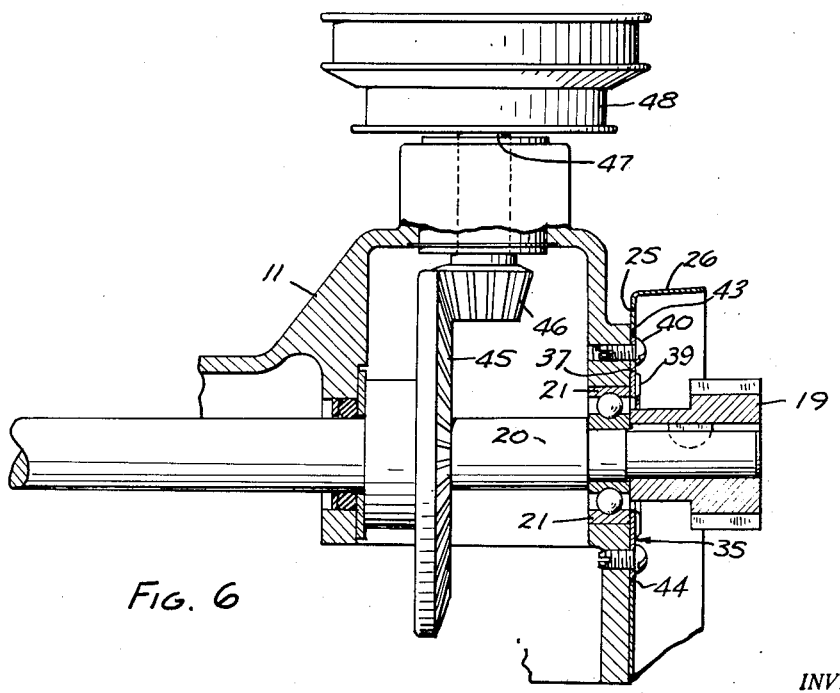
Fig. 6 is a fragmentary sectional view taken along the line 6—6 on Fig. 3, on an enlarged scale.

As shown in Fig. 6, the drive shaft 20 is driven by bevel gears 45, 46. Bevel gear 46 is fixed on a stub spindle 47 rotated by a pulley 48 which in turn has a belt drive connection with the power unit. It will be appreciated that the traction wheel on the side of the housing not shown is driven by shaft 20 in the same manner.

In assembling the various parts in position on the housing, with the drive shaft 20 journalled in bearing 21 as shown, the backing plate 25 is placed against the side of the housing with the opening 28 in alignment with the shaft 20. The bearing retainer 35 is then mounted on the housing by means of the screws 40, with the arcuate edge portions 41, 42 in the backing plate bearing against the periphery of the depressed portion 36 of the retainer 35 and the peripheral portions 38, 39 of the retainer 35 holding the backing plate 25 in position against the housing. The opening 27 in the backing plate 25 is then aligned with one of the openings 24 in the housing by rotating the backing plate 25 about the axis of the drive shaft 20. Stub shaft 23 is inserted through the aligned openings 27, 24 and washer 30 and nut 31 are placed on the end of the stub shaft 23 (Fig. 5). Pinion gear 19 may then be mounted on the end of the drive shaft 20. Washers 32, 33, 34' and wheel 13 may then be mounted on the shaft, care being exercised to engage the ring gear 22 with pinion gear 19. Bolt 34 is threaded into the stub shaft 23 to hold the wheel 13 on the shaft.

With the various parts assembled in this manner, the driving connection between the drive shaft 20 and the wheel 13 is established and the peripheral skirt 26 of the backing plate 25 projects into close proximity with the edge of the ring gear 22 preventing dirt, grass and the like from entering the area surrounding the gears.

When it is desired to change the height of cut of the lawn mower, each of the traction wheels 13 is removed by removing the bolt 34. The stub shaft 23 is then removed preferably by engaging a wrench with the hex nut portion 29 and holding the shaft against rotation while the nut 31 is threaded off the end of the shaft. After removal of the stub shaft 23, the backing plate 25 may be rotated in an arc about the axis of drive shaft 20 to bring the opening 27 of the backing plate 25 into alignment with another of the openings 24 in the side of the housing, as desired. The stub shaft 23 is then inserted through the backing plate 25 and the housing, and the washers 30 and 31 again placed in position on the stub shaft 23.

It can thus be seen that there has been provided a structure which provides a drive to the traction wheels and at the same time may be readily disassembled with a minimum removal of parts to change the vertical adjustment of the wheels in order to change the height of cut of the lawn mower. It is not necessary to remove the backing plate 25 to make this adjustment.

I claim:

1. In a self-propelled power lawn mower, the combination comprising a housing having sides thereof which are substantially vertical when the lawn mower is in operative position, a drive shaft projecting laterally through one side of said housing and adapted to be rotated when the lawn mower is operated, said housing having a multiplicity of vertically spaced openings in said side, said openings lying in an arc swung about the axis of said drive shaft, a stub shaft adapted to be mounted in one of said openings with its axis parallel to the axis of said drive shaft, a pinion gear mounted on said drive shaft, a wheel rotatably mounted on said stub shaft, a ring gear on said wheel coaxial with the wheel, said ring gear being adapted to operatively engage said pinion gear, a backing plate positioned adjacent the side of said housing, said backing plate comprising a circular flat portion adapted to contact the side of said housing and a peripheral flange projecting outwardly from the flat portion into close proximity with the ring gear on said wheel, said backing plate having a pair of openings in the flat portion thereof adapted to align with the stub shaft and drive shaft respectively, whereby the height of cut of the lawn mower may be adjusted by removing the wheel and stub shaft, rotating the backing plate about the axis of the drive shaft to bring the opening in said backing plate for said stub shaft into alignment with another of said vertically spaced openings in the side of the housing, mounting said stub shaft in the side of said housing through said newly aligned openings in the backing plate and the housing, and then finally mounting the wheel on said stub shaft.

2. The combination set forth in claim 1 wherein a bearing is positioned in the side of said housing surrounding said drive shaft and a bearing retainer is mounted on the side of said housing to maintain said bearing in said housing, said bearing retainer comprising a central depressed portion adapted to engage the bearing, a pair of tabs projecting radially outwardly from said central depressed portion and by which said retainer is mounted on said housing, and arcuate peripheral portions lying in a plane spaced from said depressed annular portion, said opening in the backing plate which is in alignment with said drive shaft comprising a pair of diametrically opposed arcuate portions adapted to engage the central depressed portions of said retainer, and a pair of segmental cut-out portions disposed laterally of said arcuate portions for preventing contact of said backing plate with the tabs on said retainer, said peripheral portions of the retainer bearing against the backing plate and tending to hold the backing plate in position adjacent the housing, whereby when the wheel and stub shaft are removed limited rotational movement of the backing plate relative to the retainer is permitted for bringing the other of said openings in said backing plate into alignment with one of said vertically spaced openings in said housing, the angular extent of said segmental cut-out portions in the backing plate being at least equal to the angular extent of the arc on which said vertically spaced openings lie.

3. In a self-propelled power lawn mower, the combination comprising a housing having sides thereof which are substantially vertical when the lawn mower is in operative position, a drive shaft projecting through one side of said housing and adapted to be rotated when the lawn mower is operated, said housing having a multiplicity of vertically spaced openings in said sides, said openings lying in an arc swung about the axis of said drive shaft, a stub shaft selectively mounted in one of said openings with its axis parallel to the axis of said drive shaft, a pinion gear mounted on said drive shaft, a wheel rotatably mounted on said stub shaft, a ring gear mounted on said wheel and adapted to operatively engage said pinion gear, a backing plate positioned adjacent the side of said housing and having a pair of openings in alignment with said drive shaft and said stub shaft, respectively, said backing plate having a peripheral flange projecting outwardly from the side of said housing into close proximity with the ring gear on said wheel, thereby preventing the entry of dirt, grass and the like into the area surrounding the pinion gear and ring gear, a bearing positioned in the side of said housing in which the drive shaft is journalled, a bearing retainer mounted on the side of said housing to maintain the bearing in position, said retainer being adapted to contact the edge of the opening in said backing plate in alignment with said drive shaft and thereby aid in accurately positioning said backing plate, said bearing retainer comprising a central annular depressed portion, tabs projecting radially from said central depressed portion, and arcuate peripheral portions lying in a plane spaced from the plane of said central depressed portion, the sides of said opening in the backing plate which is in alignment with the drive shaft having arcuate portions adapted to bear against the central depressed portions of the retainer and segmental cut-out portions disposed laterally of said side portions adapted to prevent contact of said backing plate with the tabs of the retainer, said peripheral portions of the retainer contacting said backing plate and holding said backing plate in contact with the housing, whereby limited rotational movement of the backing plate relative to the retainer may be achieved when the wheel and stub shaft are removed.

4. In a self-propelled power lawn mower, the combination comprising a housing having side walls, a drive shaft projecting through a side wall of the housing and adapted to be rotated when the lawn mower is operated, said housing having a multiplicity of vertically spaced openings in said side wall thereof, said openings lying in an arc swung about the axis of said drive shaft, a stub shaft selectively mounted in one of said openings with the axis thereof extending generally parallel to the axis of said drive shaft, a backing plate having a pair of spaced openings in alignment with the drive shaft and the stub shaft, respectively, each said shafts extending through its respective opening, a wheel rotatably mounted on said stub shaft, means extending between said drive shaft and said wheel whereby said wheel is rotated when the drive shaft is rotated, said backing plate being swingable about the axis of said drive shaft whereby the position of the housing relative to the ground may be adjusted by removing the wheel and stub shaft, swinging the backing plate about the axis of the drive shaft to bring the opening in said backing plate into alignment with another of said vertically spaced openings in the side of the housing, and mounting said stub shaft in the side of said housing through said newly aligned openings in the backing plate and the housing, said backing plate having a portion thereof along the periphery projecting into close proximity with said wheel.

5. In a self-propelled power lawn mower, a housing having sides thereof which are substantially vertical when the lawn mower is in operative position, a drive shaft projecting through one side of said housing and adapted to be rotated when the lawn mower is operated, said housing having a multiplicity of vertically spaced openings in one said side, said openings lying in an arc swung about the axis of said drive shaft, a stub shaft selectively mounted in one of said openings with its axis parallel to the axis of said drive shaft, a pinion gear mounted on said drive shaft, a wheel rotatably mounted on said stub shaft, a ring gear mounted on said wheel and adapted to operatively engage said pinion gear, a backing plate positioned adjacent the side of said housing and having a pair of openings in alignment with said drive shaft and said stub shaft, respectively, each said shaft extending through its respective opening, said backing plate being swingable about the axis of said drive shaft when said stub shaft is removed whereby the opening which normally receives the stub shaft may be selectively brought into alignment with another of said vertically spaced openings in the side of the housing, said backing plate having a peripheral flange projecting outwardly from the side of said housing into close proximity with the ring gear on said wheel, thereby preventing the entry of dirt, grass and the like into the area surrounding the pinion gear and ring gear.

6. The combination set forth in claim 5 wherein a bearing is positioned in the side of said housing in which the drive shaft is journalled and a bearing retainer is mounted on the side of said housing to maintain the bearing in position, said retainer having portions thereof contacting the edge of the opening in said backing plate through which said drive shaft extends and thereby assisting in accurately positioning said backing plate.

7. The combination set forth in claim 5 wherein said stub shaft includes an integral nut portion intermediate the ends thereof and bearing against the backing plate when the stub shaft is inserted through the opening on the backing plate and the opening in the side of the housing, and a nut threaded on the end of said stub shaft which projects through one of said vertically spaced openings into said housing to retain the stub shaft in position on said housing.

8. In a self-propelled power lawn mower, the combination comprising a housing, a drive shaft projecting through the housing and adapted to be rotated when the lawn mower is operated, said housing having a multiplicity of vertically spaced openings in the side thereof, said openings lying in an arc swung about the axis of said drive shaft, a stub shaft selectively mounted in one of said openings, a backing plate, said backing plate having a pair of openings in alignment with the drive shaft and stub shaft, respectively, said shafts extending through said openings, a wheel rotatably mounted on said stub shaft, means forming a driving connection between the wheel and said drive shaft, a bearing in the side of said housing journalling said drive shaft, a retainer secured to the side of said housing and holding said bearing in position, said retainer having means forming part of said retainer and contacting said backing plate for holding said backing plate against the side of said housing and for pivotally guiding the backing plate for swinging movement about the axis of said drive shaft, whereby when said stub shaft is removed, said backing plate may be swung to bring the opening in the backing plate into which said stub shaft normally extends into alignment with another of said vertically spaced openings.

9. The combination set forth in claim 8 wherein said means forming a part of said bearing retainer includes an arcuate shoulder engaging the edge of the opening in said backing plate which is aligned with said driving shaft for guiding said backing plate for swinging movement about the axis of said drive shaft.

10. The combination set forth in claim 9 wherein said means forming a part of said bearing retainer includes a flange portion extending radially outwardly from said arcuate shoulder to overlie the surrounding portions of said backing plate for holding said backing plate against said housing.

References Cited in the file of this patent

UNITED STATES PATENTS

| | | |
|---|---|---|
| 2,701,436 | Harnett | Feb. 8, 1955 |
| 2,701,943 | Johnson | Feb. 15, 1955 |